United States Patent [19]

Bassett

[11] 4,382,345

[45] May 10, 1983

[54] FISHING LURE

[76] Inventor: Ronald M. Bassett, 2107 Summerdale, Chicago, Ill. 60625

[21] Appl. No.: 269,484

[22] Filed: Jun. 2, 1981

[51] Int. Cl.³ .............................................. A01K 85/00
[52] U.S. Cl. ..................................................... 43/42.17
[58] Field of Search .................. 43/42.19, 42.20, 42.17

[56] References Cited

U.S. PATENT DOCUMENTS

| | | | |
|---|---|---|---|
| 1,585,943 | 5/1926 | Streich | 43/42.18 |
| 2,518,031 | 8/1950 | Lane | 43/42.2 |
| 3,012,357 | 12/1961 | Helin | 43/42.17 |
| 3,406,478 | 10/1968 | Hudson | 43/42.17 |
| 4,139,964 | 2/1979 | Pelletier | 43/42.19 |

FOREIGN PATENT DOCUMENTS 904708  11/1945  France ................................. 43/42.2

Primary Examiner—Nicholas P. Godici
Assistant Examiner—Charles L. Willis
Attorney, Agent, or Firm—Samuel Kurlandsky

[57] ABSTRACT

A fishing lure comprising a shaft, means at one end of the shaft for affixing a line thereto, body member connected to the other end of the shaft, hook means connected to the body member, and a spinner rotatably mounted on the shaft, this spinner comprising a strip of flat material formed into a frustoconical body portion, the ends of the strip being folded over each other and disposed at an angle of about 90° with respect to each other, the shaft being disposed in apertures provided in the spinner. In a preferred embodiment a tubular bearing is journaled over the shaft and has reduced ends which are disposed within and affixed to the apertures of the spinner to provide reduced friction.

10 Claims, 6 Drawing Figures

FISHING LURE

BACKGROUND OF THE INVENTION

1. Field of the Invention

The present invention relates to artificial fishing lures, and more particularly refers to a fishing lure having a novel spinner.

2. Description of the Prior Art

The history of the development of the fishing lure art is exemplified by a perennial struggle to develop a fishing lure which is more attractive to fish than to fisherman. Countless lures have been developed in the hope that they will provide an action when towed in the water calculated to delude a fish into mistaking the action of the lure for the motion of live bait. Many lures have been developed having a spinner to develop movement calculated to fool the fish. There are generally two basic types of spinners applied to lures. The most popular has been one with an elliptical outline having a dished cross-section similar in shape to that of a teaspoon. The lure is generally provided with an aperture at one end by means of which they are mounted to a shaft by means of a clevis, causing them to rotate axially about the shaft.

Another form of spinner is the propeller. The propeller may vary in configuration, but normally is of symmetrical shape with two blades diametrically opposed to each other having a central bearing for rotation about an axis.

It has been the considered consensus of accomplished fishermen that fish eventually learn to recognize artificial lures if the same lures are consistently used. Consequently those skilled in the art have striven to develop a lure which is novel to fish.

SUMMARY OF THE INVENTION

It is accordingly an object of the present invention to provide a fishing lure which will attract fish.

It is a further object to provide a fishing lure having means for providing novel motion of the lure when it is towed through the water, which motion is attractive to a lurking fish.

It is still further an object of the invention to provide a fishing lure of the type described which can be readily and inexpensively manufactured.

Other objects and advantages of the invention will become apparent upon reference to the drawings and details of the description.

According to the invention a fishing lure is provided comprising a shaft, means at one end of the shaft for affixing a line thereto, a body member connected to the other end of the shaft, a hook connected to the body member and a spinner rotatably mounted on the shaft comprising a strip of flat material bent into a shape having a frustoconical body portion and the ends being disposed at an angle of about 90° with respect to each other.

DESCRIPTION OF THE PREFERRED EMBODIMENTS

Figures 1, 2:
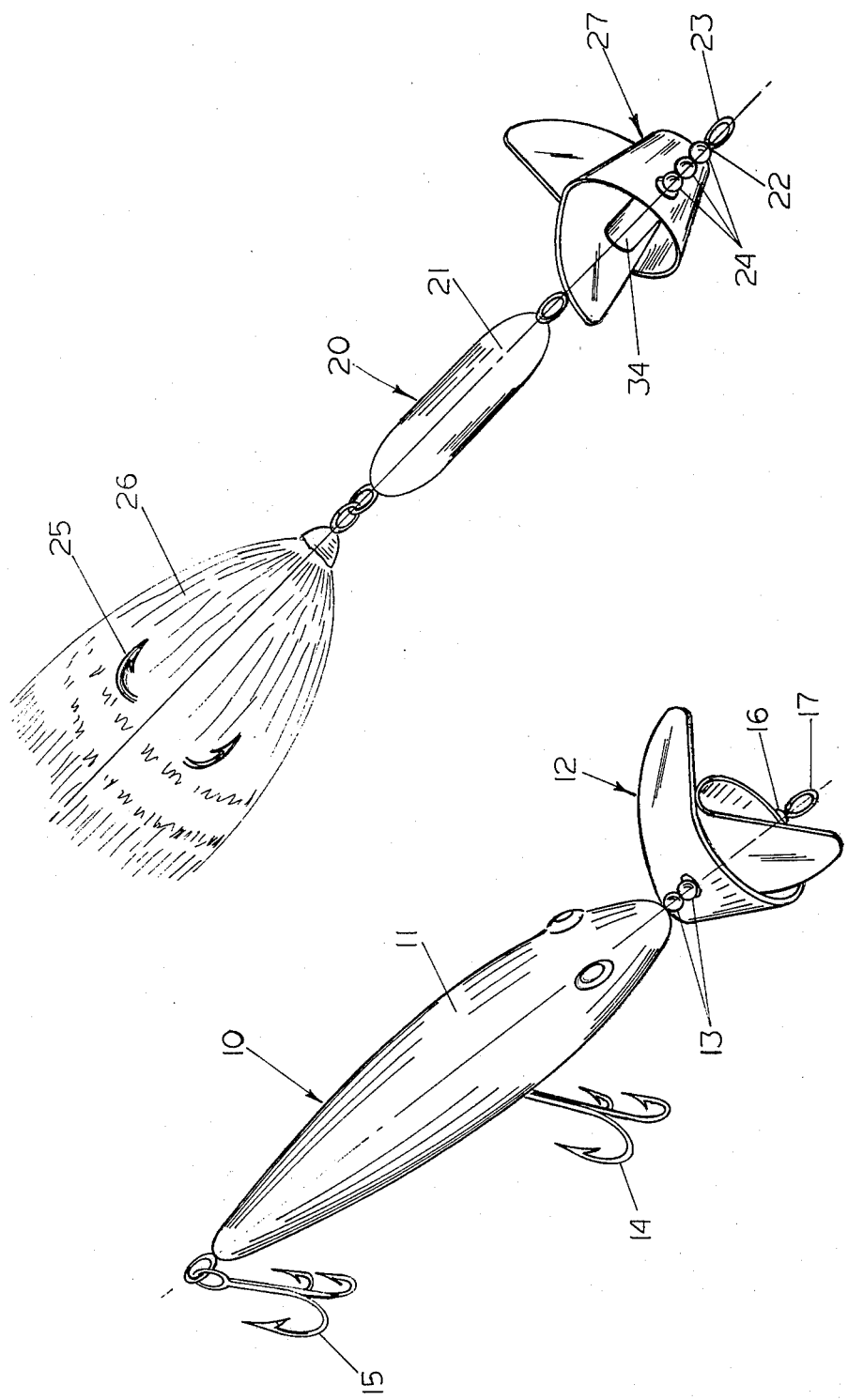
FIG. 1 is a perspective view of a fishing lure according to the invention.
FIG. 2 is a perspective view of a fishing lure according to another embodiment of the invention.

Referring to FIG. 1, a fishing lure 10 according to the invention is shown comprising a body portion 11, a spinner 12, beads 13 and hooks 14 and 15. A wire shaft 16 is mounted at one end to the body portion 11 and at the other end is provided with an eye 17 for affixing a line. The spinner 12 is rotatably journaled on the wire shaft 16.

Referring to FIG. 2, a fishing lure 20 of another form is shown having a body portion 21, a wire shaft 22 having an eye 23 at the end thereof for having a line affixed thereto, and beads 24 to reduce rotational friction. A hook 25 is affixed to the body portion 21 and is covered with a bucktail 26. A spinner 27 having a tubular bearing 34 is rotatably journaled over the wire shaft 22.

Figure 5:
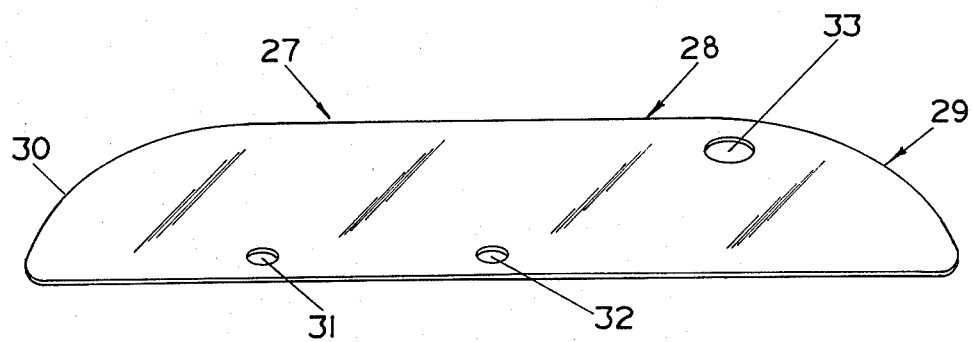
FIG. 5 is a perspective view of a strip of flat material which has been stamped or cut for forming a spinner.

Referring to FIG. 5, the material for forming the spinner 27 is shown, comprising an elongated strip of flat material 28 having arcuate ends 29 and 30. Apertures 31, 32 and 33 are provided in the strip.

Figure 3:
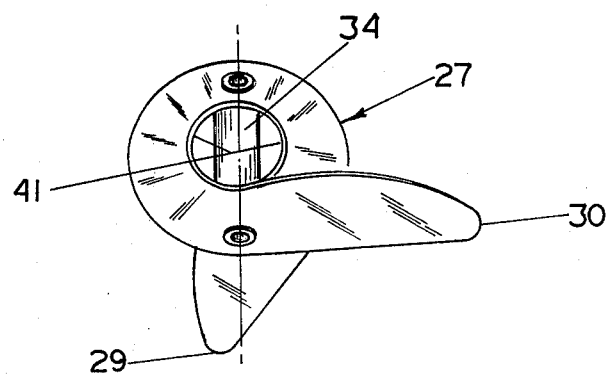
FIG. 3 is a perspective view of a spinner according to the invention in one view.

Referring to FIG. 3, the spinner 27 is shown assembled. In forming the spinner, the sheet 28 is bent and twisted to form a frustoconical body portion 39 with the ends 29 and 30 crossing each other, making contact with each other, and disposed at an angle of about 90° with respect to each other. The frustoconical body portion 39 has a large or major diameter 40 at the end from which the ends 20 and 30 extend, and a smaller or minor diameter 41 at the other end. The spinner is maintained in shape by a tubular bearing 34 having reduced ends 35 and 36 providing shoulders 37 and 38. One of the reduced ends 36 and shoulder 38 of the tubular bearing 34 extends through the aperture 32 and is affixed thereto by peening, soldering, or welding. The other end of the bearing 34 extends through the apertures 31 and 33 and is affixed thereto by peening, soldering, or welding. The bent and twisted spinner is maintained in position by virtue of having both ends and the frustoconical portion affixed to the two ends of the tubular bearing. In a preferred embodiment the two ends of the bearing 34 are affixed near the edge of the major diameter 40 of the frustoconical portion.

Figure 4:
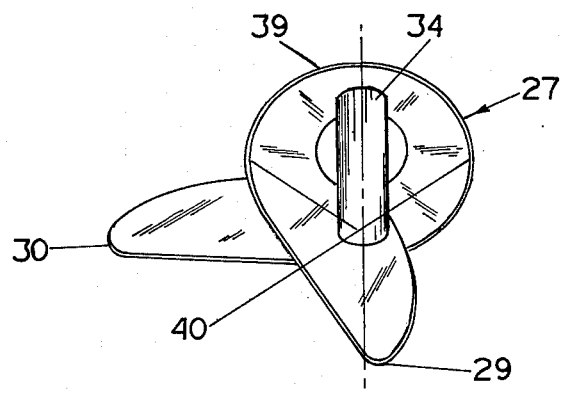
FIG. 4 is a perspective view of a spinner according to the invention in a view in which the spinner has been rotated through an angle of about 180° from the view of FIG. 3.
Figure 6:
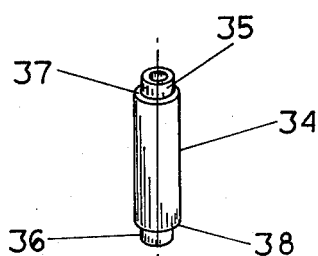
FIG. 6 is a perspective view of a tubular bearing utilized in forming a spinner according to the invention.

Referring to FIG. 4, the structure of FIG. 3 is shown after it has been rotated 180°.

In assembling the fishing lure of the present invention, the wire shaft is inserted into the opening of the tubular bearing 34 and affixed to the body portion of the lure. Beads 13 or 24 are provided at both sides of the spinner to reduce friction. The spinner is maintained in position between the eye 17 or 23 and the body portion 10 or 20, with the beads serving to reduce friction and to permit the spinner to rotate freely. The spinner is mounted with the curved frustoconical portion of the spinner away from the ends 29 and 30 in the direction in which the lure is to be drawn, and with the folded over ends 29 and 30 of the spinner positioned rearwardly and adjacent the body portion 11 and 21. In a preferred form the apertures 31, 32 and 33 should be so positioned that the ends of the bearing 34 are at the edge of the major diameter 40 of the frustoconical portion.

The body of the present fishing lure may be made of any material such as metal or plastic. The spinner is preferably formed of stainless steel, brass, aluminum, or materials whch will reflect light but which will not corrode in the water.

The lure of the present invention has a number of advantages. It provides a spinning motion when the lure is drawn through the water and, additionally, because of the contour and arrangement of the lure, provides a substantial oscillating motion. Additionally, the frustoconical surface together with the projecting blades provide a large peripheral area for light reflections from a multitude of angles because the mass and surfaces of the spinner are preferably mounted to be off-center. This results in an extreme oscillating motion when the lure is drawn through the water.

It is to be understood that the invention is not to be limited to the exact details of construction or operation or materials shown and described, as obvious modifications and equivalents will be apparent to one skilled in the art.

Invention is claimed as follows:

1. A fishing lure comprising a body member, a shaft having one end connected to said body member and the other end having means for affixing a line thereto, hook means secured to said body member and a spinner rotatably mounted on said shaft, said spinner comprising a strip of flat material of greater length than width, formed into a frustoconical body with the ends of the strip being folded over each other, and a tubular bearing member having one end affixed to the frustoconical portion of said spinner at an aperture provided therein, and having the other end affixed to both folded over ends at apertures provided in each of said ends, said shaft extending through the central opening of said tubular bearing member and through the openings of said frustoconical wall and the apertures of said folded over ends, whereby said spinner causes said lure to oscillate when drawn through the water.

2. A fishing lure according to claim 1, wherein the ends of said strip are in contact engagement with each other and disposed at an angle of about 90° with respect to each other.

3. A fishing lure according to claim 1, wherein said tubular bearing member has reduced ends one of which extends through an aperture and is affixed to the frustoconical wall of said spinner, and the other of which extends through apertures in both of said folded over ends and is affixed thereto, thereby maintaining said ends in fixed position with respect to each other.

4. A fishing lure according to claim 1, wherein said spinner is formed of stainless steel.

5. A fishing lure according to claim 1, wherein the frustoconical portion of said spinner is disposed towards the front of said lure and the crossed ends are disposed toward the rear of said lure.

6. A fishing lure according to claim 1, wherein said hook is covered by a bucktail.

7. A fishing lure according to claim 3, wherein said tubular bearing member is connected at its end to said frustoconical portion near the large diameter edge thereof or of said frustoconical portion.

8. A fishing lure according to claim 1, where each of the ends of said spinner has an arcuate edge.

9. A fishing lure according to claim 1, wherein an eyelet is provided at the forward end of said shaft.

10. A fishing lure according to claim 1, wherein beads are mounted over said shaft on both sides of said spinner.

* * * * *